United States Patent
Karaoguz et al.

(10) Patent No.: US 9,288,236 B2
(45) Date of Patent: Mar. 15, 2016

(54) ADAPTIVE MULTIMEDIA DELIVERY VIA A BROADBAND GATEWAY

(75) Inventors: Jeyhan Karaoguz, Irvine, CA (US);
Xuemin Chen, San Diego, CA (US);
Wael William Diab, San Francisco, CA (US); David Garrett, Tustin, CA (US);
David Lundgren, Mill Valley, CA (US);
Rich Prodan, Niwot, CO (US)

(73) Assignee: BROADCOM CORPORATION, Irvine, CA (US)

( * ) Notice: Subject to any disclaimer, the term of this patent is extended or adjusted under 35 U.S.C. 154(b) by 204 days.

(21) Appl. No.: 12/982,205

(22) Filed: Dec. 30, 2010

(65) Prior Publication Data

US 2011/0302276 A1  Dec. 8, 2011

Related U.S. Application Data

(60) Provisional application No. 61/351,696, filed on Jun. 4, 2010.

(51) Int. Cl.
| | |
|---|---|
| G06F 15/16 | (2006.01) |
| H04L 29/06 | (2006.01) |
| H04W 12/08 | (2009.01) |
| H04N 21/63 | (2011.01) |
| G06Q 20/10 | (2012.01) |

(Continued)

(52) U.S. Cl.
CPC ............. *H04L 65/102* (2013.01); *G05B 13/02* (2013.01); *G05F 1/66* (2013.01); *G06F 21/10* (2013.01); *G06Q 20/10* (2013.01); *G06Q 30/0215* (2013.01); *G06Q 30/0226* (2013.01); *G06Q 30/04* (2013.01); *G06Q 40/12* (2013.12); *H04L 12/1453* (2013.01); *H04L 12/66* (2013.01); *H04L 41/32* (2013.01); *H04L 47/2491* (2013.01); *H04L 63/0281* (2013.01); *H04L 63/10* (2013.01); *H04L 63/205* (2013.01); *H04L 65/40* (2013.01); *H04L 67/10* (2013.01); *H04L 67/1095* (2013.01); *H04L 67/12* (2013.01); *H04N 5/445* (2013.01); *H04N 21/482* (2013.01); *H04N 21/632* (2013.01); *H04W 12/08* (2013.01); *G06F 2221/07* (2013.01); *H04L 41/5019* (2013.01); *H04L 65/4084* (2013.01);

(Continued)

(58) Field of Classification Search
CPC ................... H04L 29/06095; H04L 29/08072; H04L 29/06; H04L 29/0809; H04L 47/10; H04L 49/90
USPC .......................... 709/217, 218, 219, 230, 234
See application file for complete search history.

(56) References Cited

U.S. PATENT DOCUMENTS

| | | | | |
|---|---|---|---|---|
| 6,618,763 B1 * | 9/2003 | Steinberg | ...................... | 709/246 |
| 6,965,948 B1 * | 11/2005 | Eneborg et al. | ............... | 709/250 |

(Continued)

*Primary Examiner* — Joseph Greene
(74) *Attorney, Agent, or Firm* — Foley & Lardner LLP; Christopher J. McKenna; Paul M. H. Pua (57) ABSTRACT

Aspects of a method and system for adaptive multimedia delivery via a broadband gateway are provided. A broadband gateway may be operable to determine which one or more of a plurality of devices is communicatively coupled to the broadband gateway. Content may be requested from, and/or scheduled to be delivered to, one or more of the devices. The gateway may be operable to select a provider from which to request the content based on results of the determining. The provider may be selected based on a bandwidth of a link between the broadband gateway and the one or more devices to which the content is to be delivered. The gateway may be operable to select one of a plurality of versions of the content based on results of the determining and requesting the selected version of the content from the selected content provider.

23 Claims, 8 Drawing Sheets

(51) Int. Cl.
  *H04L 12/24* (2006.01)
  *H04L 12/857* (2013.01)
  *G06Q 30/02* (2012.01)
  *G06F 21/10* (2013.01)
  *G06Q 40/00* (2012.01)
  *G05B 13/02* (2006.01)
  *G05F 1/66* (2006.01)
  *G06Q 30/04* (2012.01)
  *H04L 12/14* (2006.01)
  *H04L 12/66* (2006.01)
  *H04N 5/445* (2011.01)
  *H04N 21/482* (2011.01)
  *H04N 21/472* (2011.01)
  *H04L 29/08* (2006.01)

(52) U.S. Cl.
  CPC ......... *H04L 67/104* (2013.01); *H04N 21/47202* (2013.01)

(56) References Cited

U.S. PATENT DOCUMENTS

| | | | |
|---|---|---|---|
| 7,154,898 B1* | 12/2006 | Pecus et al. | 370/401 |
| 8,224,949 B2* | 7/2012 | Savoor et al. | 709/223 |
| 2003/0156543 A1* | 8/2003 | Sahinoglu et al. | 370/238 |
| 2007/0206513 A1 | 9/2007 | Cho et al. | |
| 2008/0159304 A1 | 7/2008 | Ozugur et al. | |
| 2010/0184411 A1 | 7/2010 | Chen et al. | |
| 2010/0184414 A1 | 7/2010 | Abraham et al. | |
| 2010/0184450 A1 | 7/2010 | Chen et al. | |
| 2010/0186027 A1 | 7/2010 | Hou et al. | |
| 2010/0210239 A1 | 8/2010 | Karaoguz et al. | |
| 2010/0215029 A1 | 8/2010 | Karaoguz et al. | |
| 2010/0220692 A1 | 9/2010 | Diab et al. | |
| 2010/0220731 A1 | 9/2010 | Diab et al. | |
| 2011/0252082 A1* | 10/2011 | Cobb et al. | 709/203 |
| 2011/0302309 A1* | 12/2011 | Chen et al. | 709/225 |

* cited by examiner

ADAPTIVE MULTIMEDIA DELIVERY VIA A BROADBAND GATEWAY

CLAIM OF PRIORITY

This patent application makes reference to, claims priority to and claims benefit from U.S. Provisional Patent Application Ser. No. 61/351,696 filed on Jun. 4, 2010.

The above stated application is hereby incorporated herein by reference in its entirety.

INCORPORATION BY REFERENCE

This application also makes reference to:
U.S. patent application Ser. No. 12/982,231 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,993 filed on Dec. 30, 2010;
U.S. patent application Ser. No. 12/982,216 filed on Dec. 30, 2010;
U.S. patent application Ser. No. 12/982,433 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/982,414 filed on Dec. 30, 2010;
U.S. patent application Ser. No. 12/981,733 filed on Dec. 30, 2010;
U.S. patent application Ser. No. 12/395,383 filed on Feb. 27, 2009;
U.S. patent application Ser. No. 12/355,537 filed on Jan. 16, 2009;
U.S. patent application Ser. No. 12/355,480 filed on Jan. 16, 2009;
U.S. patent application Ser. No. 12/372,648 filed on Feb. 17, 2009;
U.S. patent application Ser. No. 12/355,413 filed on Jan. 16, 2009;
U.S. patent application Ser. No. 12/355,377 filed on Jan. 16, 2009;
U.S. patent application Ser. No. 12/395,470 filed on Feb. 27, 2009; and
U.S. patent application Ser. No. 12/391,009 filed on Feb. 23, 2009;

Each of the above stated applications is hereby incorporated herein by reference in its entirety.

FIELD OF THE INVENTION

Certain embodiments of the invention relate to a broadband gateway. More specifically, certain embodiments of the invention relate to a method and system for adaptive multimedia delivery via a broadband gateway.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more televisions that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcast, service providers may require use of dedicated set-top boxes (STBs) that may be used to encrypt broadcast signals communicated from the service providers to generate suitable video and/or audio streams that may be played via televisions and/or other display/playback devices in the household. Furthermore, STBs and/or TVs may support Internet access. Thus, rather than using a computer to access the Internet, a user may find it more convenient to use the flat screen televisions and/or monitors in homes for the same purpose. To do so, for example, an STB communicatively coupled to a flat screen television may be provided with web browsing software and protocols, and Internet connectivity, which may enable the user to easily access the Internet or check their electronic mail (email), for example, from a convenient and comfortable location such as their living room.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for adaptive multimedia delivery via a broadband gateway, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for adaptive multimedia delivery via a broadband gateway. A broadband gateway may be operable to determine which one or more of a plurality of devices are communicatively coupled to the broadband gateway. Content may be requested from, and/or scheduled to be delivered to, one or more of the plurality of communicatively coupled devices. The gateway may be operable to select a provider from which to request the content based on results of the determination. The provider may be selected from a plurality of content and/or service providers, which may include one or more network access service providers. The gateway may be operable to handle at least one physical layer connection to at least one corresponding network access service provider. The at least one physical layer connection may comprise a plurality of physical layer connections and the at least one corresponding network access service provider may comprise a plurality of corresponding network access service providers. Different ones of the plurality of providers may be communicatively coupled to the broadband gateway via different ones of the plurality of physical layer connections. The provider may be selected based on a bandwidth of a link between the broadband gateway and the one or more devices to which the content is to be delivered. The provider may also be selected based on a display resolution of the one or more devices to which the content is to be delivered.

The gateway may be operable to select one of a plurality of versions of the content based on results of the determining and requesting the selected version of the content from the selected provider. Each of the plurality of versions of the content may require different bandwidth to be communicated from the selected provider to the broadband gateway. In instances that the content comprises video, the video may be of different resolution for each of the plurality of versions of the content. The determining may be performed occasionally and/or periodically at times leading up to a time at which the content is scheduled to be delivered. The determining may be performed just prior to a time at which the content is scheduled to be delivered.

Figure 1:
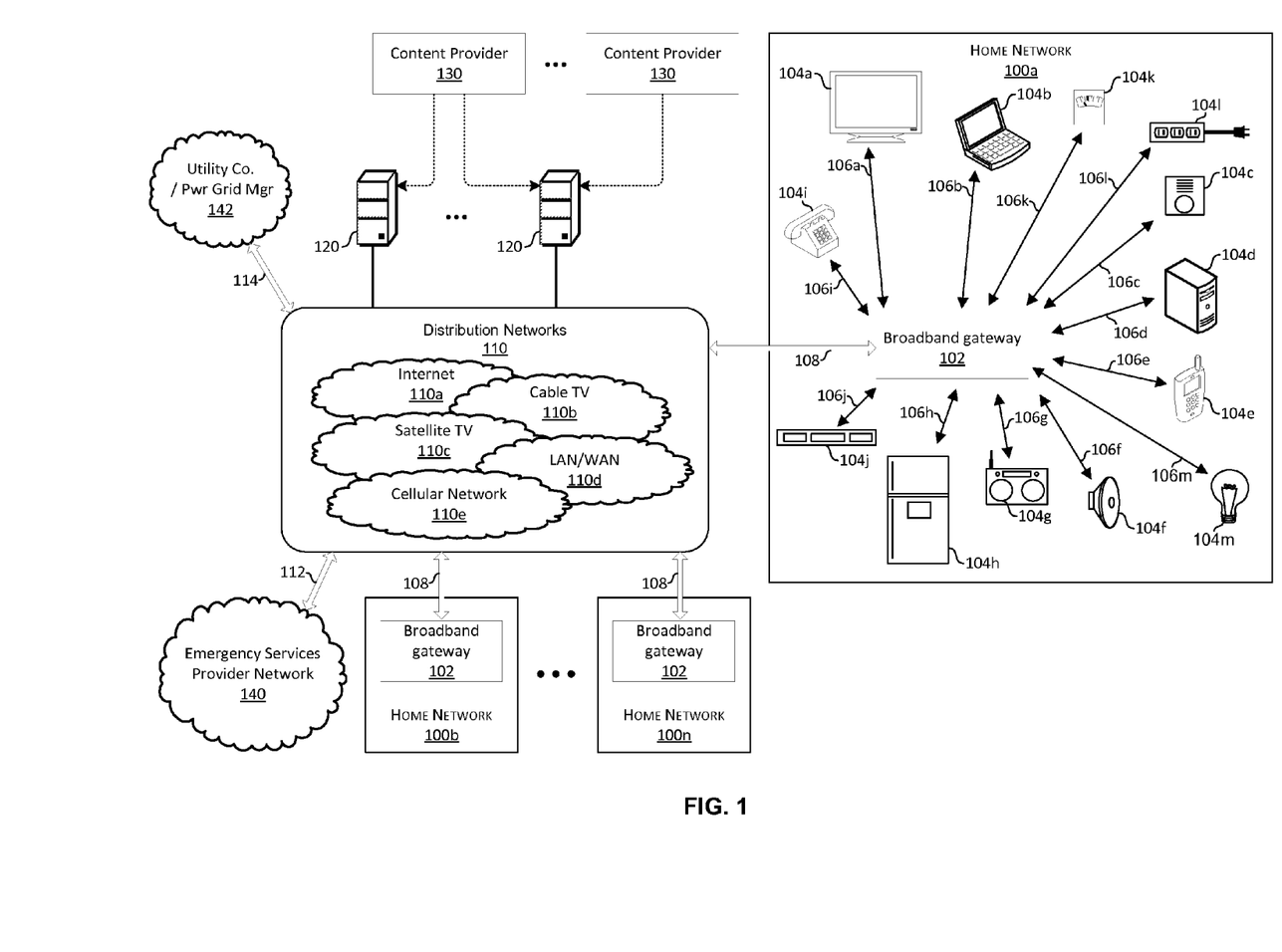
FIG. 1 is a block diagram illustrating an exemplary communication system that comprises a home network serviced by a broadband gateway, in accordance with an embodiment of the invention.

FIG. 1 is a block diagram illustrating an exemplary communication system that comprises a home network serviced by a broadband gateway, in accordance with an embodiment of the invention. Referring to FIG. 1, there is shown a home network 100a, a plurality of distribution networks 110, a plurality of service providers 120, and a plurality of content providers 130. The home network 100A may be serviced by a broadband gateway 102. Also shown in FIG. 1 are additional home networks 100b, . . . , 100n, an emergency services provider network 140, and a network of a power grid management entity 142. Each of the home networks 100b, . . . , 100n may also be serviced by a broadband gateway 102.

The service providers 120 may comprise various entities which may provide various services to the devices 104 via the gateway 102 and/or to the gateway 102 itself. Some of the service providers 120 may comprise network access service providers which provide physical layer connections to the gateway 102. Such physical layer connections may then be utilized to access, and/or may be part of, one or more of the distribution networks 110. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers.

The content providers 130 may generate, capture, and/or package content, such as multimedia content, that may be distributed to end-users. The content may comprise, for example, audio, video, e-book, gaming, and/or other content. The content may be, for example, downloadable and/or streaming, rented and/or purchased. In some instances, a content provider and a service provider may be separate. In some instances, a single provider may provide both content and services. For example, an entity that functions as a network access service provider may also provide content and/or services other than network access and, thus, that entity may also be accurately referred to as a "content provider" and/or a "service provider." Content and/or services that are provided by a content provider 130 and/or a service provider 120 may be provided to the gateway 102 via a physical layer connection provided by a network access service provider 120.

The plurality of distribution networks 110 may comprise one or more networks that may be operable to enable wireless, optical, and/or wired communication among a plurality of entities based on one or more networking and/or communication infrastructures. In this regard, the plurality of distribution networks 110 may be utilized to enable distributing multimedia content generated by the content providers 130, directly and/or via the service providers 120, to end-users. The network connectivity available via the plurality of distribution networks 110 may be based on one or more communication standards and/or protocols. The plurality of distribution networks 110 may comprise, for example, the Internet 110*a*, a CATV network 110*b*, a satellite television (TV) network 110*c*, a wireless local area network/wide area network (LAN/WAN) 110*d*, and/or a cellular network 110*e*.

The Internet 110*a* may comprise a system of interconnected networks to enable exchange of data between a plurality of nodes, based on one or more networking standards, including, for example, the Internet Protocol (IP). For example, the Internet 110*a* may enable connectivity among a plurality of private and public, academic, business, and/or government nodes and/or networks. The physical connectivity may be provided in the Internet 110*a* via, for example, the Public Switched Telephone Network (PSTN), copper wires, fiber-optic cables, wireless interfaces, and/or other protocols and/or standards-based interfaces. The transport functionality may be performed in the Internet 110*a* based on, for example, one or more protocols, such as the Transmission Control Protocol/IP (TCP/IP), for example. The CATV network 110*b* may comprise suitable distribution nodes, systems, and/or subnetworks that may enable forwarding of communication between CATV providers and a plurality of cable-TV consumers. For example, the CATV network 110*b* may comprise a network of fiber optics and/or coaxial cables for use in CATV broadcasts. The satellite TV network 110*c* may comprise suitable distribution nodes, systems, and/or subnetworks that may enable communication of satellite TV broadcast by satellite TV providers to a plurality of consumers. For example, the satellite network 110*c* may comprise a plurality of orbiting satellite nodes and/or one or more terrestrial centers in a satellite-TV system.

The LAN/WAN network 110*d* may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110*e* may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110*e* may comprise, for example, a plurality of control and/or switching nodes, and a plurality of base stations that enable transmission and/or reception of cellular based communications between the cellular network 110*e* and cellular capable devices.

The home network 100*a* may correspond to a location that may comprise a plurality of devices 104 which may be serviced and/or managed by the broadband gateway 102. In this regard, the location may be a residence (e.g., home, apartment), a small business, a school, a library, and/or other like settings in which users may want to obtain access to service and/or to content provider networks. The broadband gateway 102 may be utilized in the home network 100*a* to provide connectivity between the home network 100*a* and the service providers 120 (and/or the content providers 130) via the distribution networks 110.

The broadband gateway 102 may comprise suitable logic, circuitry, interfaces, and/or code that may be operable to provide connectivity between one or more devices in a home network, such as the home network 100*a*, and a plurality of external networks. For example, the broadband gateway 102 may handle a plurality of broadband physical layer connections 108 to the distribution networks 110. The broadband physical layer connections 108 may comprise wired, optical, and/or wireless connections between the broadband gateway 102 and the distribution networks 110. The broadband gateway 102 may operate as an interface device that may allow one or more service and/or content providers to interact with various devices in the home network. In this regard, the broadband gateway 102 may be operable to perform and/or provide various services that may pertain to enabling and/or facilitating reception of content from one or more content providers, wherein the content may be delivered through one or more services providers. For example, the broadband gateway 102 may be operable to perform such operations as network access related processing (e.g., PHY/MAC, transport layer processing), encryption and/or decryption, user and/or account authentication, and/or at least some of video and/or audio processing operations that may be needed for consumption of multimedia content. The broadband gateway 102 may communicate with various devices in the home network 100, using wired and/or wireless communication links.

A single gateway 102 may be operable to handle multiple physical layer (i.e., layer 1 of the open-systems interconnection model (OSI)) connections 108 to multiple ones, or portions, of the distribution networks 110, where different ones or portions of the distribution network(s) 110 are owned, operated, leased, or otherwise associated with different network access service providers 120. For example, a first network access service provider 120 may provide network access to the gateway 102 via a DSL connection over twisted-pair cabling, and a second network access service provider 120 may provide network access to the gateway 102 via a cable television connection over coaxial cabling. In some instances, the gateway 102 may be operable to concurrently communicate over multiple physical layer connections 108 provided by multiple network access service providers 120.

The broadband gateway 102 may also be operable to provide and/or support various other, non-content related services in the home network 100. For example, the broadband gateway 102 may be operable to provide energy management in the home network 100*a*, by controlling and/or adjusting configuration of one or more devices in the home network to reduce power consumption for example.

Devices serviced by, and/or communicatively coupled with the broadband gateway 102 may comprise content consuming devices and/or other, non-content consuming household or home devices that may be operable to interact with the broadband gateway 102. For example, the broadband gateway 102 may service, and/or may communicate with a plurality of home devices 104*a*-104*m* in the home network 100*a*.

The devices 104a-104m may each be referred to as a communication device or an electronic device. The home devices may comprise, for example, one or more of a television 104a, a laptop computer 104b, a smoke detector, a carbon monoxide detector, and/or a security alarm 104c, a computer and/or server 104d, a mobile phone 104e, a speaker 104f, an AM/FM radio 104g, a phone 104h, an appliance 104i (e.g., refrigerator), a digital video recorder (DVR) or personal video recorder (PVR) 104j, a thermostat or other environmental control(s) 104k, a power strip 104l, and lighting systems and/or controls 104m. The broadband gateway 102 may interact with each of the home devices 104a-104m via links 106a-106m, which may be supported by the broadband gateway 102 and the corresponding home device. For example, the link 106a between the broadband gateway 102 and the television 104a may comprise a High-Definition Multimedia Interface (HDMI) cable. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102. The link 106h may comprise, for example, a phone line. The link 106i may comprise, for example, a wired or wireless Ethernet link. The link 106j may comprise, for example, a wired or a wireless link. The link 106k may comprise, for example, a wired or wireless link. The link 106m may comprise, for example, a wired or wireless link.

The power strip 104l may comprise one or more outlets and may comprise one or more plugs or other means of connecting to a power supply, such as a wall outlet. The power strip 104l may comprise suitable logic, circuitry, interfaces, and/or code that may be operable to measure and/or monitor energy consumed via one or more of its outlets, enable and disable consumption of power via one or more of its outlets, and/or limit current drawn via one or more if its outlets. The power strip 104l may be operable to communicate energy measurements via the link 106l. Also, enabling, disabling, limiting, or otherwise controlling power consumed via one or more outlets of the power strip 104l may be performed in response to messages received via the link 106l. The link 106l may comprise a wired or wireless link. The power strip 106l may be operable to communicate with the gateway 102 utilizing power line communication. For example, the gateway 102 may be plugged into an outlet of the power strip 106l and communicate with the gateway 102 via that outlet, or the gateway 102 and the power strip 104l may each be plugged into a common power distribution system.

As illustrated in FIG. 1, a plurality of home networks 100b, . . . , 100n, may also be connected to the distribution networks 110. These home networks 100b, . . . , 100n may operate in substantially the same manner as the home network 100a. By having multiple home networks connected to the distribution networks 110, various applications, such as peer-to-peer communication and/or data aggregation operations may be possible by utilizing the broadband gateways 102 in the home networks.

In operation, the broadband gateway 102 may request content from one or more providers 120 and/or 130 and deliver the content to one or more of the devices 104. The version of the content requested and/or the provider 120 and/or 130 from which the content is requested may be determined based on one or more parameters. Different versions of video content may, for example, be of different resolutions and/or be compressed differently. For example, a low-bandwidth version of a video may be of lower resolution and/or higher compression than a corresponding high-bandwidth version of the video. Different versions of audio content may, for example, utilize different bit rates, different amounts of compression, and/or have different numbers of channels. For example, a low-bandwidth version of an audio track may comprise two channels, left and right, whereas a high-bandwidth version may comprise 5 or 7 channels. Exemplary parameters utilized to determine a version and/or provider of content comprise: bandwidth available in a distribution network 110, user preferences, characteristics of the device(s) 104 to which the content is to be delivered, and characteristics of the link(s) 106 over which the content is to be delivered.

User preferences may comprise, for example, a list that ranks the devices 104 in order of preference for consuming certain types of content. For example, an order of preference for video content may comprise: the TV 104a, the laptop 104b, and the phone 104e. Accordingly, prior to requesting scheduled video content, the gateway 102 may first determine whether it is able to communicate with the TV 104. The gateway 102 may be unable to communicate with the TV 104a in instances when, for example, the TV 104a is powered off or disconnected from the gateway 102. If so, the gateway 102 may request a higher-bandwidth version of the video content and/or request the video content from a provider that can deliver a high-bandwidth version. If the gateway 102 is unable to communicate with the TV 104a, then the gateway 102 may determine whether it is able to communicate with the laptop 104b. If so, the gateway 102 may request an intermediate-bandwidth version of the video content and/or request the video content from a provider that can deliver an intermediate-bandwidth version. If the gateway 102 is also unable to communicate with the laptop 104a, then the gateway 102 may determine whether it is able to communicate with the phone 104e. If so, the gateway 102 may request a lower-bandwidth version of the video content and/or request the video content from a provider that can deliver a lower-bandwidth version.

Characteristics of the devices 104 may comprise, for example, display resolution, battery life, available memory, and/or available processing power. For example, a higher-bandwidth version of a video may be requested when the destination device is a high-definition television 104a and a lower-bandwidth version of the video may be requested when the destination device is a standard-definition television 104a. For another example, a higher-bandwidth version of a video may be requested when the destination device is the laptop 104b while it is plugged into a power outlet, and a lower-bandwidth version may be requested when the destination device is the laptop 104b while it is running on battery power.

Characteristics of the link may comprise, for example, the type of link and the bandwidth supported by the link. For example, a higher-bandwidth version of content may be requested when the content is to be delivered over a HDMI link, whereas a lower-bandwidth version of content may be delivered in instances when the content is to be delivered over a wireless link such as a cellular of IEEE 802.11 link.

Figure 2:
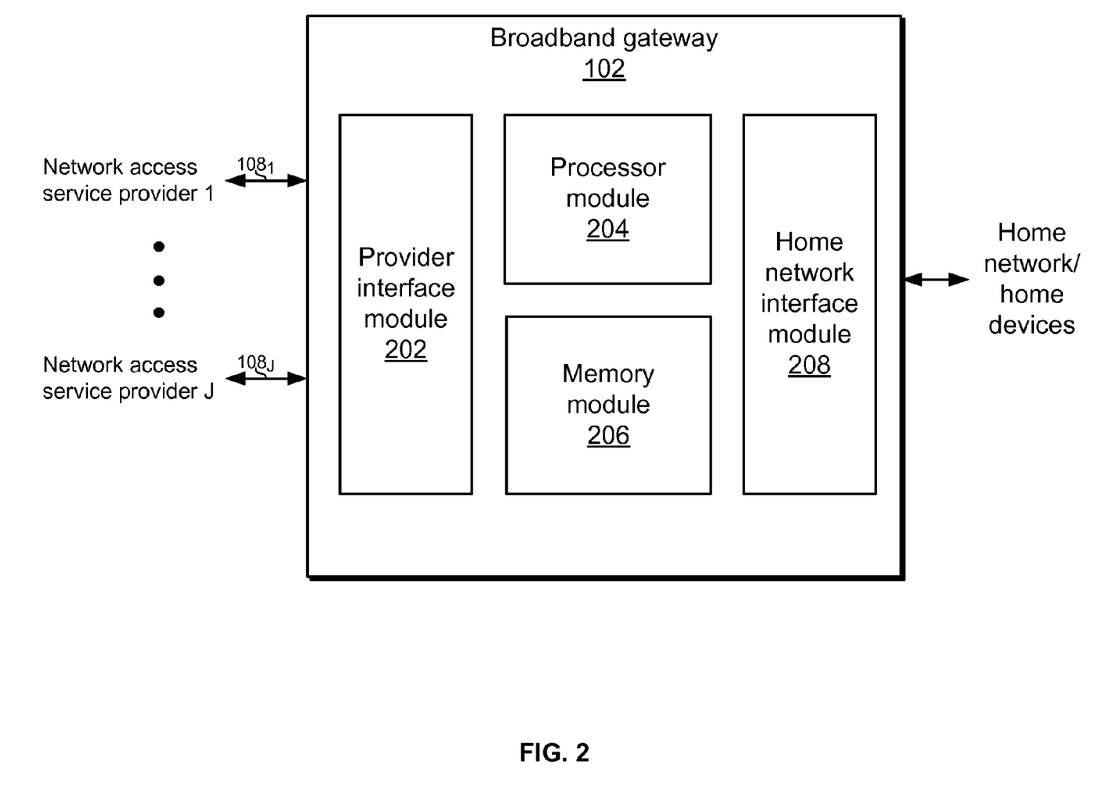
FIG. 2 is a block diagram illustrating an exemplary broadband gateway, in accordance with an embodiment of the invention.

FIG. 2 is a block diagram illustrating an exemplary broadband gateway, in accordance with an embodiment of the invention. Referring to FIG. 2, the broadband gateway 102 may comprise suitable logic, circuitry, code, and/or interfaces that may be operable to provide connectivity between one or more networks, such as the distribution networks 110 shown in FIG. 1, for example, and one or more devices in a home network, such as the home devices 104a-104j in the home network 100a shown in FIG. 1. In this regard, the broadband gateway 102 may operate as an interface device that allows one or more devices in the home network to access one or more networks, and to access various services and/or content via those one or more networks. For example, the broadband gateway 102 may be utilized to enable interaction between the plurality of service providers 120 and/or the plurality of content providers 130, and the home devices 104a-104j.

The broadband gateway 102 may communicate with the various devices via a home network that may comprise wired, optical, and/or wireless communication links, such as the home network 100a. In this regard, the broadband gateway 102 may comprise suitable hardware and/or software to provide some or all of the functions and/or operations of one or more of a modem, a router, and a switch. The modem functions and/or operations may be those of a digital subscribed line (DSL) modem, a cable modem, and/or a wireless cable modem, for example. The router functions and/or operations may be those of a wireless router, for example. The switch functions and/or operations may be those of a network switch, or a local area network (LAN) switch, for example. In some instances, the broadband gateway 102 may communicate with the various devices in the home via more than one home network.

The broadband gateway 102 may comprise one or more modules. Each of these modules may comprise hardware, software, or a combination thereof that may be utilized to perform various operations associated with the broadband gateway 102. In an embodiment of the invention, the broadband gateway 102 may comprise a provider interface module 202, a processor module 204, a memory module 206, and a client network interface module 208. In some instances, the broadband gateway 102 may be such that the various modules listed above may be distributed over multiple devices. Moreover, the modules listed above are provided by way of illustration and not of limitation. Other configurations and/or architectures of the broadband gateway 102 may also be implemented. For example, the broadband gateway 102 may be a virtual gateway that is setup in a network by utilizing virtual machines (VMs) and/or next-generation (NG) data centers.

The provider interface module 202 may comprise suitable logic, circuitry, code, and/or interfaces that may be operable to receive data from and/or send data to one or more service/content providers via one or more physical layer connections 108 to one or more network access service providers. In this regard, each of the physical layer connections $108_1$-$108_J$ may connect the gateway 110 to a different network access service provider. Each of the physical layer connections 108 may comprise a wired, optical, or wireless connection. Each of the physical layer connections 108 may utilize different physical media and/or different physical layer protocols. For example, the connection $108_1$ may comprise a DSL over twisted-pair connection and the connection $108_J$ may comprise a CATV over coaxial cable connection.

The processor module 204 may comprise suitable logic, circuitry, code, and/or interfaces that may be operable to process data received from the service/content providers and/or data received from one or more devices 104 in the home. Data from one or more devices 104 may comprise user input such as feedback regarding consumed content and responses to questionnaires, surveys, and polls. Data received from the service/content providers via one or more physical layer connections $108_1$-$108_J$ may be processed to make it suitable for communication to a device 108 and data from the one or more devices 104 may be processed to make it suitable for communication to the service/content providers via one or more the physical layer connections $108_1$-$108_J$. In this regard, the processor module 124 may comprise one or more portions that are suitable to handle certain types of data such as video data and/or audio data, for example. The processor module 204 may also be operable to generate a graphical user interface (GUI) which may be manipulated via which a user may provide input. The GUI may be displayed as part of an OSD on a local device 104, such as a monitor or television, and may be manipulated via a remote control and/or other input device that communicates directly with the gateway 102. The GUI may be a web-based interface, and a user may interact with it via a computer and web browser. The GUI may be customized based on characteristics of the gateway 102, the device 104 coupled to the gateway, and the service and/or content providers associated with the gateway 102. The processors module 124 may utilize the memory 206 in performing its functions.

The memory module 206 may comprise suitable logic, circuitry, code, and/or interfaces that may be operable to store data utilized in the operations of the broadband gateway 102. For example, the memory module 206 may be utilized to store configuration data, parameters, device information, tracking and/or monitoring information, security information, and intermediate processing data, for example. The memory module 206 may comprise storage media that may be integrated in the broadband gateway 102 and/or may be removable such as a removable storage device.

The client network interface module 208 may comprise suitable logic, circuitry, code, and/or interfaces that may be operable to receive data from and/or send data to one or more devices in the home network. The client network interface module 208 may be operable to support multiple communication protocols, standards, and/or data transport technologies. In this regard, the client network interface module 208 may handle one or more physical layer connections to one or more devices 104. For example, the client network interface module 208 may comprise, one or more wired and/or wireless Ethernet interfaces, one or more analog and/or digital audio outputs, one or more audio/video interfaces such as such as HDMI and DisplayPort, one or more USB interfaces, one or more IEEE 1394, and/or one or more telephone jacks.

The broadband gateway 102 may be operable to provide energy management by varying the configuration of one or more devices in the home network. The broadband gateway 102 may collect and/or store energy-related information of the devices in the home network and/or of the links in the home network, and may utilize such information to control the operation of the home devices. For example, the broadband gateway 102 may utilize channel capacity flexibility and content coding options to minimize and/or optimize power utilization. The broadband gateway 102 may also configure and/or manage the configuration of the network between the broadband gateway 102 and one or more service/content providers based on the energy-related information associated with the devices in the home. For example, at least a portion of the distribution networks 100 may be configured and/or managed in this manner. The broadband gateway 102 may be utilized to display energy-related metrics, including consumption trends and/or costs, for example, and to display any available credits/rewards that may be redeemed by an account holder. In some instances, when a device in the home network is a certified device, such as a California efficient display, for example, the broadband gateway 102 may be utilized to provide that information to a service/content provider and obtain rewards/credits associated with the use of such certified devices. Moreover, overall network power consumption may be managed by sharing information among multiple interconnected broadband gateways.

The broadband gateway 102 may be operable to adapt and/or enable changes in a subscription model and/or in multimedia delivery characteristics based on the capabilities of the various devices in the home network. For example, high-definition video content may be delivered to certain type of devices, such as digital televisions (DTVs), while low-definition video content and/or text may be delivered to a different type of devices, such as personal mobile devices. In this regard, the broadband gateway 102 may be utilized to reduce bandwidth and/or processing power consumption in the home network. The broadband gateway 200 may also support and/or use multi-transport processing, which may be performed sequentially, in parallel, and/or utilizing distributed processing.

The gateway functionality associated with a user, such as security features, preferences, applications, electronic programming guides (EPGs), and user profile, for example, may be ported from the broadband gateway 102 to one or more other broadband gateways 102 in other locations. In some instances, a visitor may be allowed access to their content outside their service/content provider service area by, for example, classifying the access level for different users and/or by providing limited access to content. Moreover, the broadband gateway 102 may allow multiple user interface software structures by, for example, standardizing an interface to service/content providers and devices in the home network.

The broadband gateway 102 may be operable to broker and/or arbitrate with service/content providers the consumption of certain services, such as music and video, for example. In some instances, the broadband gateway 102 may perform content search, transport discovery, ranking, and/or sorting. These operations may be performed based on content quality, price, quality-of-service (QOS), and network protocols supported by the devices in the home network, such as service level agreements (SLAB), for example.

Various emergency-related services in the home network may be supported by the broadband gateway 102, including allowing first responders to provide alerts to a select group of users by accessing the broadband gateway 102 via secure links provided by the service/content providers. For example, the broadband gateway 102 may enable an emergency service provider, such as those associated with the emergency service provider network 140 described above in FIG. 1, to access one or more devices in the home network.

For peer-to-peer communication, the broadband gateway 102 may be utilized to allow enhanced content sharing in a service/content provider network. In this regard, the broadband gateway 102 may be utilized to construct a directory service for peer-to-peer connectivity with friends and family, for example. The broadband gateway 102 may be utilized to provide incentives to users who engage in peer-to-peer communication through, for example, the distribution networks 110. Moreover, the broadband gateway 102 may be utilized to match the content coding to the service type being consumed by the user and to make the necessary allocations through the network with respect to peer-to-peer or conventional Internet programming or broadcast programming.

The broadband gateway 102 may be utilized in connection with constrained network resources, such as time of day, traffic congestion, and the like, for example, to provide incentives for a user to accept a lower cost, lower quality of service that is dynamically configured for current network conditions. In some instances, the broadband gateway 102 may allow enhanced low latency service delivery to client devices in a home network.

The broadband gateway 102 may be operable to run or execute an agent to extract content, rating, copyright, language, privacy rules, and automatically add user-generated content, for example. Such agent may be run or executed in connection with the processor module 204 of the broadband gateway 102, for example. In some instances, the broadband gateway 102 may be operable to provide rating-related information or channel prediction to a service/content provider to assist with fast channel change.

Bandwidth optimization by, for example, placing future requests for bandwidth to a service/content provider and accepting the best timeslots provided in return may be enabled by the broadband gateway 102.

The broadband gateway 102 may be operable to combine and/or blend multiple contents for use as single content in the home network. Such combination may be performed in one or more of the modules of the broadband gateway 102. For example, the broadband gateway 102 may blend different video and audio contents for an event by accessing one or more service/content providers and providing automatic and/or manual content synchronization.

The protection, management, and/or tracking of confidential data, such as health and financial records, for example, by tagging the data may be provided by the broadband gateway 102. Only when a user authorizes the transfer of the confidential data will such data be stored and/or aggregated. The broadband gateway 102 may be operable to create a trusted rating mechanism for content. The broadband gateway 102 may be secure against external threats that may be downloaded from outside the home network and may provide a secure domain distribution in the home network. Automated and secured billing and payment services may also be provided by the broadband gateway 102.

The broadband gateway 102 may be operable to utilize client or home device profile information to select layered video service(s) and/or transmission. Such information may be stored, at least temporarily, in the memory module 206 of the broadband gateway 102. In some instances, the programming and/or enhanced video layers received by the broadband gateway 102 may be aggregated midstream by one or more network or routing nodes.

The broadband gateway 102 may support a reduction in the cost of unwatched content by using multi-tier billing for downloaded content, such as video content. The broadband gateway 102 may be utilized to provide a unified payment portal for collecting and/or aggregating charges from multiple service and/or content providers.

In operation, prior to requesting content via the provider interface module 202, the processor module 204 may determine whether any devices for which the content may be destined are communicatively coupled to, or reachable via, the home network interface module 208. Upon determining that a destination device is communicatively coupled to, or reachable via, the module 208, the processor module 204, utilizing the memory module 206 and the interface module 208, may analyze various parameters, such as those described with respect to FIG. 1, to determine a version of the content to request and/or to determine a provider to request the content from. A request for the determined version of the content may then be sent to the determined provider via the interface module 202.

FIGS. 3A-3F illustrate various exemplary scenarios of content being delivered via a broadband gateway, in accordance with an embodiment of the invention.

Figure 3A:
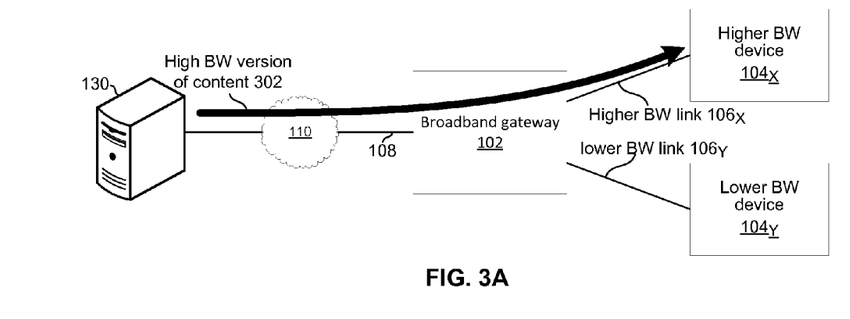
FIGS. 3A-3F are diagrams that illustrate various exemplary scenarios of content being delivered via a broadband gateway, in accordance with an embodiment of the invention.
Figure 3B:
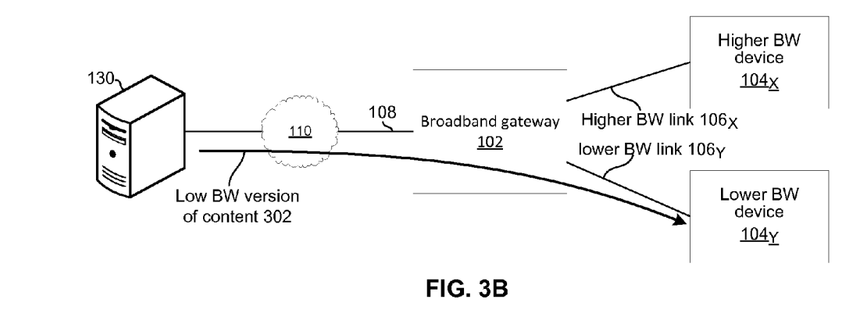

Referring to FIGS. 3A and 3B, there is shown a provider 130, network(s) 110, physical layer connection 108, gateway 102, links $106_X$ and $106_Y$, higher-bandwidth device $104_X$, and lower-bandwidth device $104_Y$. The provider 130, network(s) 110, and physical layer connection 108 may be as described above. The links $106_X$ and $106_Y$ may correspond to two of the links $106_1$-$106_m$ described above. The devices $104_X$ and $104_Y$ may correspond to two of the devices $104_1$-$104_m$ described above. The higher-bandwidth device $104_X$ may comprise, for example, a high-resolution display and the lower-bandwidth device $104_Y$ may comprise, for example, a lower-resolution display. The higher-bandwidth link $106_X$ may comprise, for example, a HDMI link and the lower-bandwidth link $106_Y$ may comprise, for example, a wireless link.

FIG. 3A is a diagram that illustrates an exemplary scenario in which the gateway 102 determines that content 302 is to be delivered to the higher-bandwidth device $104_X$ via the higher-bandwidth link $106_X$. Accordingly, the gateway 102 requests a higher-bandwidth version of the content 302 from the content provider 130. In response to the request, the content may be delivered from the provider 130 to the device $104_X$ via a delivery path comprising the network(s) 110, the physical layer connection 108, the gateway 102, and the link $106_X$.

FIG. 3B is a diagram that illustrates an exemplary scenario in which the gateway 102 determines that content 302 is to be delivered to the lower-bandwidth device $104_Y$ via the lower-bandwidth link $106_Y$. Accordingly, the gateway 102 requests a lower-bandwidth version of the content 302 from the content provider 130. In response to the request, the content may be delivered from the provider 130 to the device $104_Y$ via a delivery path comprising the network(s) 110, the physical layer connection 108, the gateway 102, and the link $106_Y$.

Figure 3C:
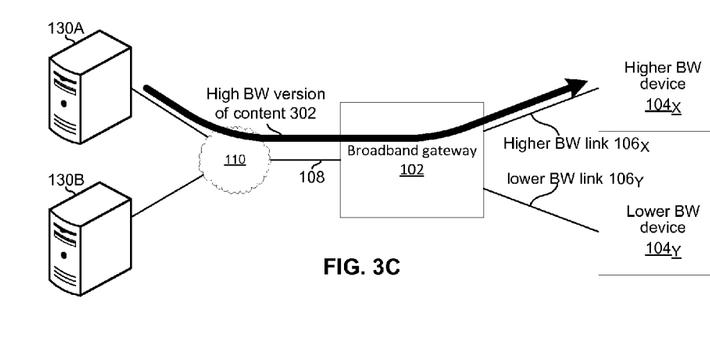
Figure 3D:
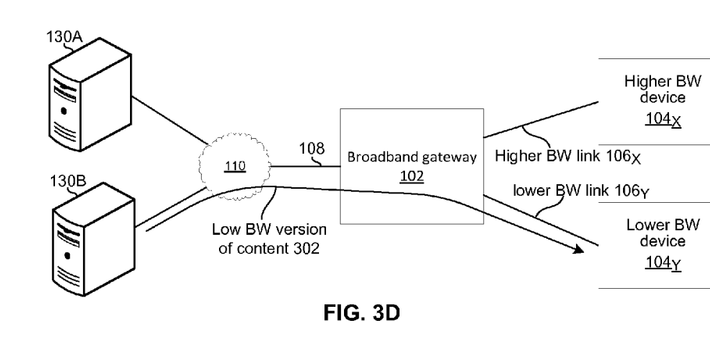

Referring to FIGS. 3C and 3D, there is shown providers 130A and 130B, network(s) 110, physical layer connection 108, gateway 102, links $106_X$ and $106_Y$, higher-bandwidth device $104_X$, and lower-bandwidth device $104_Y$. The providers 130a and 130B may each correspond to a provider 130 described above. The network(s) 110 and physical layer connection 108 may be as described above. The links $106_X$ and $106_Y$ may correspond to two of the links $106_1$-$106_m$ described above. The devices $104_X$ and $104_Y$ may correspond to two of the devices $104_1$-$104_m$ described above. The higher-bandwidth device $104_X$ may comprise, for example, a high-resolution display and the lower-bandwidth device $104_Y$ may comprise, for example, a lower-resolution display. The higher-bandwidth link $106_X$ may comprise, for example, a HDMI link and the lower-bandwidth link $106_Y$ may comprise, for example, a wireless link.

FIG. 3C is a diagram that illustrates an exemplary scenario in which the gateway 102 determines that content 302 is to be delivered to the higher-bandwidth device $104_X$ via the higher-bandwidth link $106_X$. Accordingly, the gateway 102 requests the higher-bandwidth version of the content 302 from a content provider 130A that is enabled to provide a higher-bandwidth version. In response to the request, the content may be delivered from the provider 130A to the device $104_X$ via a delivery path comprising the network(s) 110, the physical layer connection 108, the gateway 102, and the link $106_X$.

FIG. 3D is a diagram that illustrates an exemplary scenario in which the gateway 102 determines that content 302 is to be delivered to the lower-bandwidth device $104_X$ via the lower-bandwidth link $106_X$. Accordingly, the gateway 102 requests the lower-bandwidth version of the content 302 from a content provider 130B that is enabled to provide a lower-bandwidth version. In response to the request, the content may be delivered from the provider 130B to the device $104_Y$ via a delivery path comprising the network(s) 110, the physical layer connection 108, the gateway 102, and the link $106_Y$.

Figure 3E:
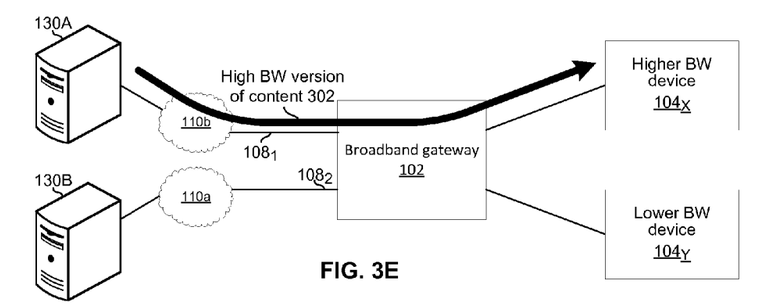
Figure 3F:
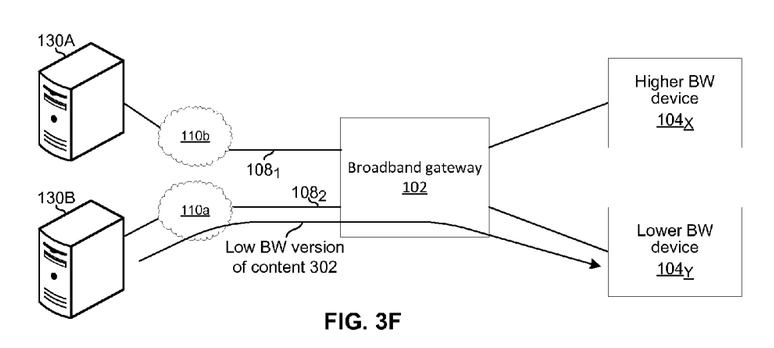

Referring to FIGS. 3E and 3F, there is shown providers 130A and 130B, network(s) 110, physical layer connections $108_1$ and $108_2$, gateway 102, links $106_X$ and $106_Y$, higher-bandwidth device $104_X$, and lower-bandwidth device $104_Y$. The providers 130a and 130B may each correspond to a provider 130 described above. The network(s) 110 and physical layer connections $108_1$ and $108_2$ may be as described above. The links $106_X$ and $106_Y$ may correspond to two of the links $106_1$-$106_m$ described above. The devices $104_X$ and $104_Y$ may correspond to two of the devices $104_1$-$104_m$ described above. The higher-bandwidth device $104_X$ may comprise, for example, a high-resolution display and the lower-bandwidth device $104_Y$ may comprise, for example, a lower-resolution display. The higher-bandwidth link $106_X$ may comprise, for example, a HDMI link and the lower-bandwidth link $106_Y$ may comprise, for example, a wireless link.

FIG. 3E is a diagram that illustrates an exemplary scenario in which the gateway 102 determines that content 302 is to be delivered to the higher-bandwidth device $104_X$ via the higher-bandwidth link $106_X$. Accordingly, the gateway 102 requests, via a first physical layer connection $108_1$, the higher-bandwidth version of the content 302 from a content provider 130A that is enabled to provide a higher-bandwidth version. In response to the request, the content may be delivered from the provider 130A to the device $104_X$ via a delivery path comprising the network(s) 110, the physical layer connection $108_1$, the gateway 102, and the link $106_X$.

FIG. 3F is a diagram that illustrates an exemplary scenario in which the gateway 102 determines that content 302 is to be delivered to the lower-bandwidth device $104_X$ via the lower-bandwidth link $106_X$. Accordingly, the gateway 102 requests, via a second physical layer connection $108_2$, the lower-bandwidth version of the content 302 from a content provider 130B that is enabled to provide a lower-bandwidth version. In response to the request, the content may be delivered from the provider 130B to the device $104_Y$ via a delivery path comprising the network(s) 110, the physical layer connection $108_2$, the gateway 102, and the link $106_Y$.

Figure 4:
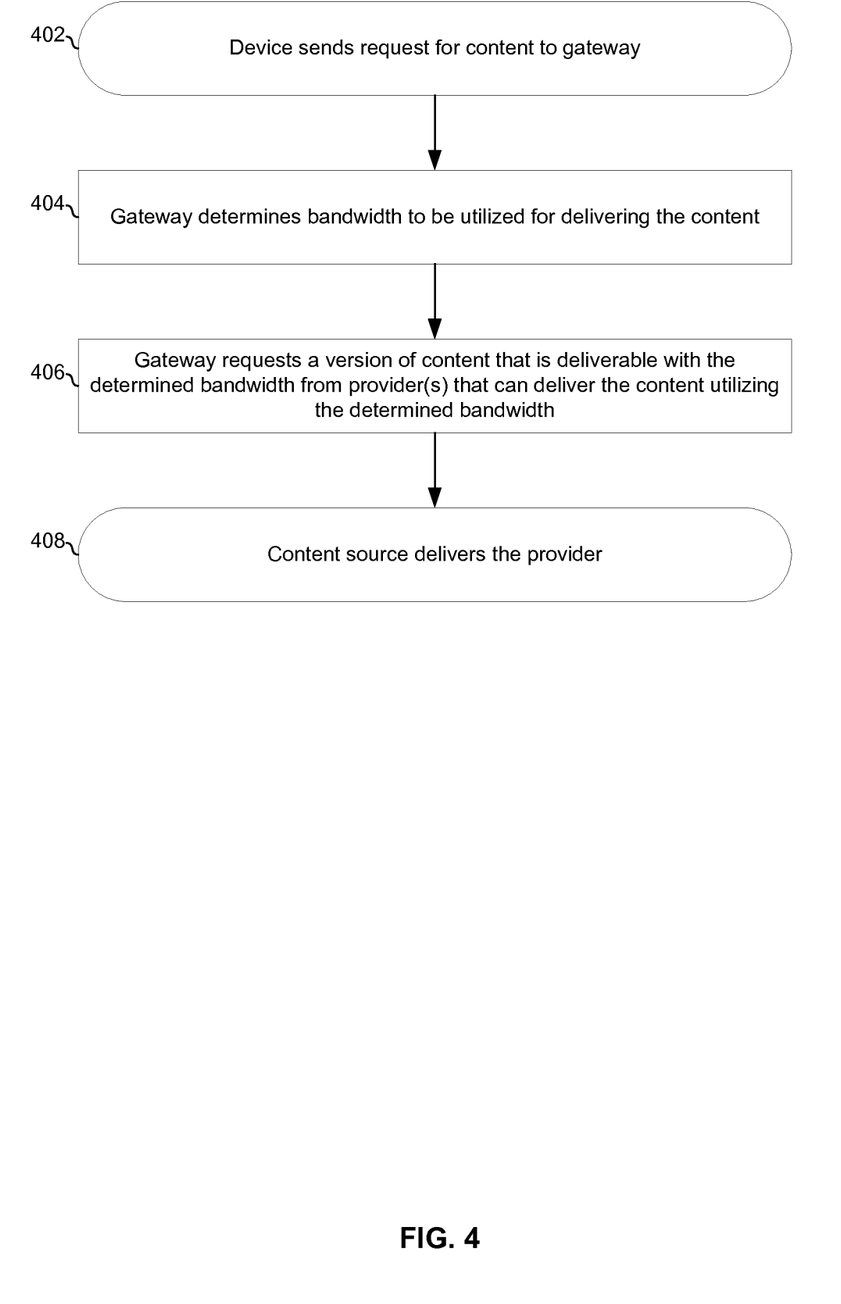
FIG. 4 is a flowchart illustrating exemplary steps for adaptive multimedia delivery via a broadband gateway, in accordance with an embodiment of the invention.

FIG. 4 is a flowchart illustrating exemplary steps for adaptive multimedia delivery via a broadband gateway, in accordance with an embodiment of the invention. Referring to FIG. 4, the exemplary steps begin with step 402 when a device 104 sends a request for content to the gateway 102. In step 404, the gateway 102 may determine an amount of bandwidth that is available, optimal, and/or desirable for delivering the content from a provider 120 and/or 130 to the gateway 102. Where optimal may, for example, refer to a minimal amount of bandwidth that still allows for acceptable user experience in consuming the content. In step 406, the gateway 102 may request a version of the content that can be delivered in the determined bandwidth and/or request the content from a provider that can deliver the content in the determined bandwidth. In step 408, the provider may deliver the content to the gateway 102 and the gateway 102 may deliver the content to the device 104.

Figure 5A:
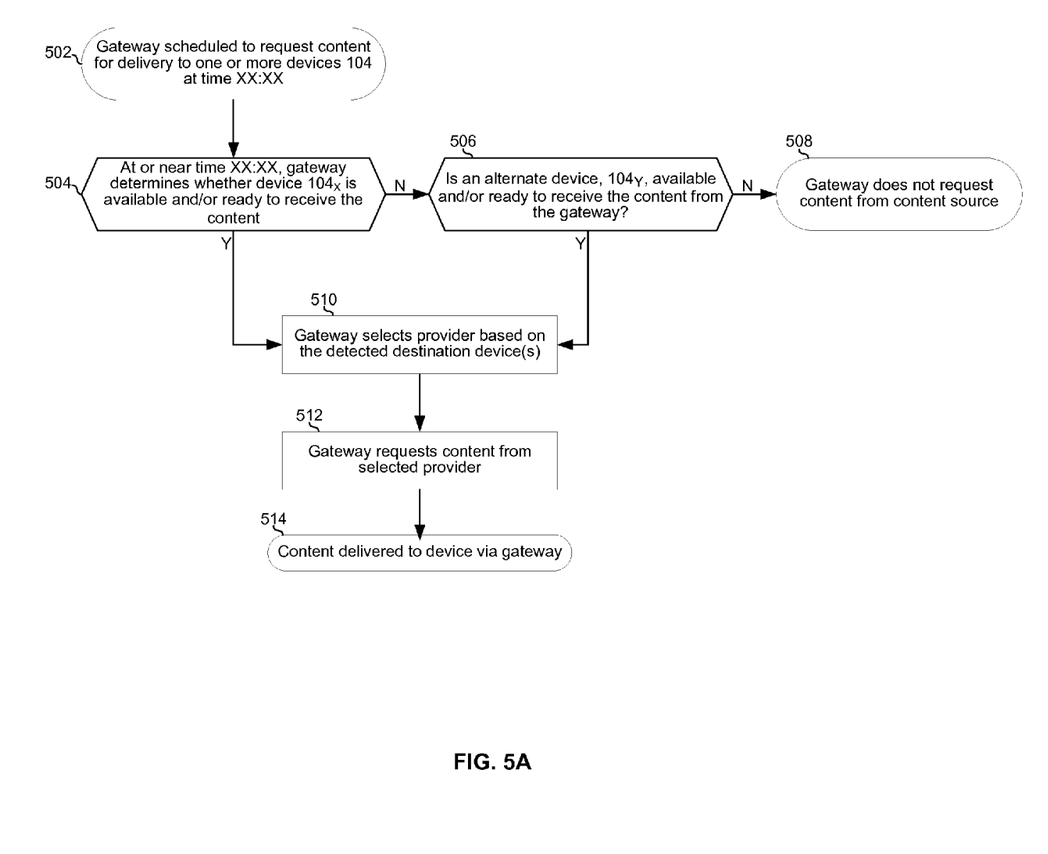
FIG. 5A is a flowchart illustrating exemplary steps for selecting a provider of content to optimize bandwidth usage, in accordance with an embodiment of the invention.

FIG. 5A is a flowchart illustrating exemplary steps for selecting a provider of content to optimize bandwidth usage, in accordance with an embodiment of the invention. Referring to FIG. 5A, the exemplary steps begin with step 502 in which the gateway 102 is scheduled to deliver content to one or more devices 104 at time XX:XX. For example, a user may, via an electronic programming guide, program the gateway 102 to deliver content to one or more devices 104 at time XX:XX. In an exemplary embodiment of the invention, which device(s) 104 the content is delivered to may be determined based on user preferences. Additionally, which device(s) 104 the content is delivered to may depend on which devices are communicatively coupled to, or reachable by, the gateway 102 at time XX:XX, as is described with respect to steps 504 and 506.

In step 504, at or near time XX:XX, the gateway 102 may determine whether the device 104$_X$ is available and/or ready to receive the content. In instances that the device 104$_X$ is not available and/or ready to receive the content (e.g., it is powered off or busy with other tasks), the exemplary steps may advance to step 506.

In step 506, at or near time XX:XX, the gateway 102 may determine whether the device 104$_Y$ is available and/or ready to receive the content. In instances that the device 104$_Y$ is not available and/or ready to receive the content, the exemplary steps may advance to step 508. The device 104$y$ may not be available when, for example, it is powered off or busy with other tasks.

In step 508, with no devices to deliver the content to, the gateway 102 may cancel or defer requesting the content. In this manner, bandwidth in the network(s) 110 and/or resources of the provider(s) 120 and/or 130 may be allocated for other tasks rather than delivering content that is not being consumed at that time.

Returning to step 504, in instances that the device 104$_X$ is available and ready to receive the content, the exemplary steps may advance to step 510.

Returning to step 506, in instances that the device 104$y$ is available and ready to receive the content, the exemplary steps may advance to step 510.

In step 510, the gateway 102 may select one or more providers from which to request the content. The provider(s) 120 and/or 130 may be selected based on various parameters such as bandwidth, user preferences, characteristics of the destination device(s) 104, and characteristics of a link 106 over which the gateway 102 will deliver the content to the destination device(s) 104. Subsequent to step 510, the exemplary steps may advance to step 512.

In step 512, the gateway 102 may request the content from the selected provider(s) 120 and/or 130. Subsequent to step 512, the exemplary steps may advance to step 514.

In step 514, the provider(s) 120 and/or 130 may deliver the content to the gateway 102 and the gateway 102 may deliver the content to the destination device(s) 104.

Figure 5B:
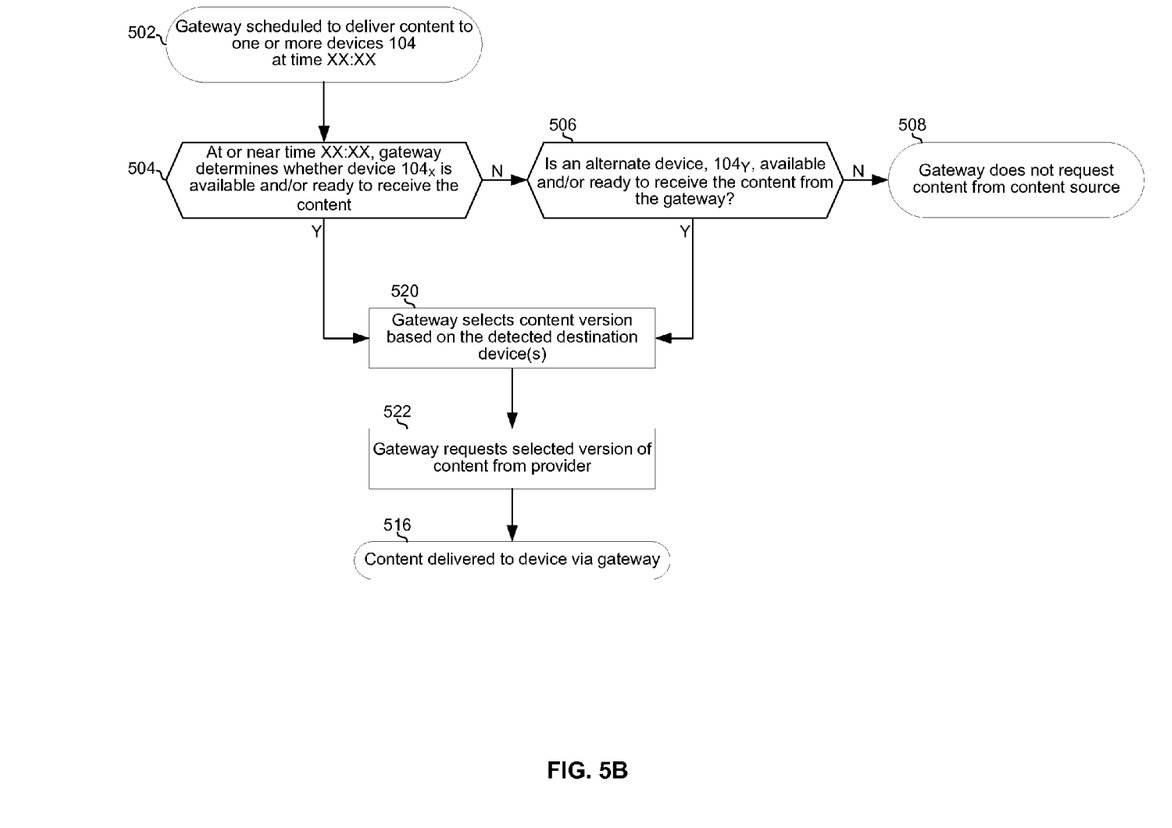
FIG. 5B is a flowchart illustrating exemplary steps for selecting a version of content to optimize bandwidth usage, in accordance with an embodiment of the invention.

FIG. 5B is a flowchart illustrating exemplary steps for selecting a version of content to optimize bandwidth usage, in accordance with an embodiment of the invention. FIG. 5B is largely the same as FIG. 5A but with steps 520 and 522 replacing steps 510 and 512, respectively, of FIG. 5A.

In step 520, the gateway 102 may select a version of the content to be delivered. For example, the gateway 102 may select between different versions of a video that have different resolution and/or amounts of compression. The selection may be based on various parameters such as bandwidth, user preferences, characteristics of the destination device(s) 104, and characteristics of a link 106 over which the gateway 102 will deliver the content to the destination device(s) 104. Subsequent to step 520, the exemplary steps may advance to step 522.

In step 522, the gateway 102 may request the selected version of the content from a provider 120 and/or 130. Subsequent to step 522, the exemplary steps may advance to step 516.

Various aspects of a method and system for adaptive multimedia delivery via a broadband gateway are provided. In an exemplary embodiment of the invention, a broadband gateway 102 may be operable to determine which one or more of a plurality of devices 104 is communicatively coupled to the broadband gateway 102. Content may be requested from, and/or scheduled to be delivered to, one or more of the devices 104 that are communicatively coupled to the broadband gateway 102. The gateway 102 may be operable to select a provider from which to request the content based on results of the determination. The selected provider may be selected from a plurality of providers 120 and/or 130. The content and/or service providers 120 and/or 130 from which a provider is selected may comprise one or more network access providers. The gateway 102 may be operable to handle at least one physical layer connection 108 to at least one corresponding network access service provider 120. The at least one physical layer connection 108 may comprise a plurality of physical layer connections 108$_1$-108$_J$ and the at least one corresponding network access service provider 120 may comprise a plurality of corresponding network access service providers 120. Different one of the plurality of providers 120 and/or 130 from which the content is available may be communicatively coupled to the broadband gateway 102 via different ones of the plurality of physical layer connections 108$_1$-180$_J$. The provider may be selected based on a bandwidth of a link 106 between the broadband gateway 102 and the one or more devices 104 to which the content is to be delivered. The provider 120 and/or 130 may be selected based on a display resolution of the one or more devices 104 to which the content is to be delivered.

The gateway 102 may be operable to select one of a plurality of versions of the content based on results of the determining and requesting the selected version of the content from the selected provider 120 and/or 130. Each of the plurality of versions of the content may require different bandwidth to be communicated from the selected provider 120 and/or 130 to the broadband gateway. In instances that the content comprises video, the video may be of different resolution for each of the plurality of versions of the content. The determining may be performed occasionally and/or periodically at times leading up to a time at which the content is scheduled to be delivered. The determining may be performed just prior to a time at which the content is scheduled to be delivered.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for adaptive multimedia delivery via a broadband gateway.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
determining, by a broadband gateway configured to handle at least one physical layer connection to at least one network access service provider, an order of preference for consuming content of a first content type among a plurality of devices communicatively coupled to said broadband gateway, said first content type being one of a plurality of types of content;
determining, by said broadband gateway at a time said broadband gateway is scheduled to deliver a first content of said first t e a first device available for consuming said first content according to said order of preference for consuming content of the first content type, a bandwidth of a first link between the broadband gateway and said first device , and a version of said first content to deliver to said first device according to said bandwidth of said first link between the broadband gateway and said first device, each of the plurality of devices communicatively coupled to said broadband gateway via a respective link of a respective bandwidth;
selecting, by said broadband gateway according to said determined version of said first content and said bandwidth of said first link between said broadband gateway and said first device, a content provider from which to receive said version of said first content, wherein said content provider is enabled to provide said version of said first content to said first device and is selected from among a plurality of content providers; and
requesting said version of said first content from said content provider.

2. The method according to claim 1, wherein said at least one physical layer connection comprises a plurality of physical layer connections and said at least one network access service provider comprises a plurality of access service providers, and wherein each of said plurality of physical layer connections corresponds to a respective one of said plurality of access service providers.

3. The method according to claim 2, wherein different ones of said content providers are communicatively coupled to said broadband gateway via different ones of said plurality of physical layer connections.

4. The method according to claim 1, comprising:
determining a type of communications link between said broadband gateway and said first device; and
selecting said content provider based further on said determined type of communications link, said determined type of communications link comprising one of a wired, optical or wireless link.

5. The method according to claim 1, comprising:
determining a communications link characteristic between said broadband gateway and said first device; and
determining said version of said first content from among a plurality of versions of said first content based at least in part on said communications link characteristic,
wherein each of said plurality of versions of said first content requires a different network bandwidth to be communicated from a corresponding content provider to said broadband gateway.

6. The method according to claim 1, comprising:
determining at least one device characteristic among display resolution, battery life, available memory, or available processing power characteristics for said first device; and
determining said version of said first content from among a plurality of versions of said first content based at least in part on said at least one device characteristic.

7. The method according to claim 1, comprising:
determining which one or more of said plurality of devices are communicatively coupled to said broadband gateway at least one of aperiodically or periodically at times leading up to a time at which said version of said first content is scheduled to be delivered; and
determining said version of said first content based further on which one or more of said plurality of devices are communicatively coupled to said broadband gateway.

8. The method according to claim 1, comprising:
determining which one or more of said plurality of devices are communicatively coupled to said broadband gateway just prior to a time at which said version of said first content is scheduled to be delivered; and
determining said version of said first content based further on which one or more of said plurality of devices are communicatively coupled to said broadband gateway.

9. The method according to claim 1, comprising selecting said content provider based further on a bandwidth of a link between said broadband gateway and said content provider.

10. The method according to claim 1, comprising selecting said content provider based further on a display resolution of said first device.

11. A system for networking, the system comprising:
at least one processor, circuit, or combination thereof fir use in a broadband gateway operable to handle at least one physical layer connection to at least one network access service provider, said at least one processor, circuit, or combination thereof being configured to:
determine an order of preference for consuming content of a first content type among a plurality of devices communicatively coupled to said broadband gateway, said first content type being one of a plurality of types of content;
determine, at a time said broadband gateway is scheduled to deliver a first content of said first content type, a first device available for consuming said first content according to said order of preference for consuming content of the first content t se, a bandwidth of a first link between the broadband gateway and said first device , and a version of said first content to deliver to said first device according to said bandwidth of said first link between said broadband gateway and said first device, each of the plurality of devices communicatively coupled to said broadband gateway via a respective link of a respective bandwidth;
select, according to said determined version of said first content and said bandwidth of said first link between said broadband gateway and said first device, a content provider from which to receive said version of said first content, wherein said content provider is enabled to provide said version of said first content for said first device and is selected from among a plurality of content providers; and request said version of said first content from said content provider.

12. The system according to claim 11, wherein said at least one physical layer connection comprises a plurality of physical layer connections and said at least one network access service provider comprises a plurality of access service providers, and wherein each of said plurality of physical layer connections corresponds to a respective one of said plurality of access service providers.

13. The system according to claim 12, wherein different ones of said content providers are communicatively coupled to said broadband gateway via different ones of said plurality of physical layer connections.

14. The system according to claim 11, wherein said at least one processor, circuit, or combination thereof is configured to:
   determine a type of communications link between said broadband gateway and said first device; and
   select said content provider based further on said determined type of communications link, said determined type of communications link comprising one of a wired, optical or wireless link.

15. The system according to claim 11, wherein said at least one processor, circuit, or combination thereof is configured to:
   determine a communications link characteristic between said broadband gateway and said first device; and
   determine said version of said first content from among a plurality aversions of said first content based at least in part on said communications link characteristic,
   wherein each of said plurality of versions of said first content requires a different network bandwidth to be communicated from a corresponding content provider to said broadband gateway.

16. The system according to claim 11, wherein said at least one processor, circuit, or combination thereof is configured to:
   determine at least one device characteristic among display resolution, battery life, available memory, or available processing power characteristics for said first device; and
   determine said version of said first content from among a plurality of versions of said first content based at least in part on said at least one device characteristic.

17. The system according to claim 11, wherein said at least one processor, circuit, or combination thereof is configured to:
   determine which one or more of said plurality of devices are communicatively coupled to said broadband gateway at least one of aperiodically or periodically at times leading up to a time at which said version of said first content is scheduled to be delivered; and
   determine said version of said first content based further on which one or more of said plurality of devices are communicatively coupled to said broadband gateway.

18. The system according to claim 11, wherein said at least one processor, circuit, or combination thereof is configured to:
   determine which one or more of said plurality of devices are communicatively coupled to said broadband gateway just prior to a time at which said version of said first content is scheduled to be delivered; and
   determine said version of said first content based further on which one or more of said plurality of devices are communicatively coupled to said broadband gateway.

19. The system according to claim 11, wherein said at least one processor, circuit, or combination thereof is configured to select said provider based further on a bandwidth of a link between said broadband gateway and said content provider.

20. The system according to claim 11, wherein said at least one processor, circuit, or combination thereof is configured to select said content provider based further on a display resolution of said first device.

21. A method for networking, the method comprising:
   determining, by a broadband gateway, an order of preference for consuming content of a first content type among a plurality of devices communicatively coupled to said broadband gateway based on device characteristics of said plurality of devices, said first content type being one of a plurality of types of content;
   determining, by said broadband gateway at a time said broadband gateway is scheduled to deliver a first content of said first content type, a first device available for consuming said first content according to said order of preference for consuming content of the first content type, a bandwidth of a first link between the broadband gateway and said first device, and a version of said first content to deliver to said first device according to said bandwidth of said first link between the broadband gateway and said first device. each of the plurality of devices communicatively coupled to said broadband gateway via a respective link of a respective bandwidth;
   selecting, by said broadband gateway according to said determined version of said first content and said bandwidth of said first link between said broadband gateway and said first device, a content provider enabled to provide said version of said first content for said first device, from among a plurality of content providers from which to receive content; and
   requesting said version of said first content from said content provider.

22. The method according to claim 21, comprising:
   determining a communications link characteristic between said broadband gateway and said first device; and
   selecting said content provider based further on said communications link characteristic.

23. The method according to claim 21, comprising:
   determining at least one device characteristic among display resolution, battery life, available memory, or available processing power characteristics for said first device; and
   selecting said content provider based further on said at least one device characteristic.

* * * * *